(12) United States Patent
Zach et al.

(10) Patent No.: US 10,333,419 B2
(45) Date of Patent: Jun. 25, 2019

(54) INPUT RESPONSIVE AC-AC CONVERTER FOR HEAT TRACING

(71) Applicant: nVent Services GmbH, Schaffhausen (CH)

(72) Inventors: Juergen J. Zach, Redwood City, CA (US); Arsham Shirkhani, Redwood City, CA (US); Dan Caouette, Katy, TX (US); James F. Beres, Incline Village, NV (US)

(73) Assignee: nVent Services GmbH, Schaffhausen (CH)

( * ) Notice: Subject to any disclaimer, the term of this patent is extended or adjusted under 35 U.S.C. 154(b) by 0 days.

(21) Appl. No.: 15/983,997

(22) Filed: May 18, 2018

(65) Prior Publication Data

US 2018/0337611 A1    Nov. 22, 2018

Related U.S. Application Data (60) Provisional application No. 62/508,282, filed on May 18, 2017.

(51) Int. Cl.
*H05B 3/00* (2006.01)
*H02M 5/257* (2006.01)
(Continued)

(52) U.S. Cl.
CPC ........ *H02M 5/2573* (2013.01); *H05B 3/0004* (2013.01); *H05B 3/56* (2013.01);
(Continued)

(58) Field of Classification Search
CPC . H02M 5/00–5/38; H05B 3/0004; H05B 3/56
See application file for complete search history.

(56) References Cited

U.S. PATENT DOCUMENTS 7,477,530 B2    1/2009    Tashima et al.
7,518,895 B2    4/2009    Shekhawat et al.
(Continued)

FOREIGN PATENT DOCUMENTS

WO    2008008143 A2    1/2008
WO    2014062675 A1    4/2014

*Primary Examiner* — Kyle J Moody
*Assistant Examiner* — Peter M Novak
(74) *Attorney, Agent, or Firm* — Quarles & Brady LLP (57) ABSTRACT

A power converter for heat tracing applications is disclosed. The power converter includes a controller configured to control an input switching stage. The power converter also includes an output filter, the output filter electrically coupled to the input switching stage. Further, the power converter includes a passive cooling element, the passive cooling element coupled to the power converter. The controller is configured to select a peak voltage and set a power converter output voltage based on at least one of the peak voltage and a power converter input voltage. The passive cooling element is configured to decrease a temperature of the power converter and to obviate the need for cooling with moving parts, making the system viable for hazardous areas in addition to non-hazardous areas. The input switching stage includes a plurality of transistors. The power converter output voltage and the power converter input voltage are both alternating current.

20 Claims, 8 Drawing Sheets

(51) Int. Cl.
*H05B 3/56* (2006.01)
*H02M 1/00* (2006.01)
*H02M 5/293* (2006.01)

(52) U.S. Cl.
CPC ............... *H02M 2001/0025* (2013.01); *H02M 2005/2932* (2013.01)

(56) References Cited

U.S. PATENT DOCUMENTS

| | | |
|---|---|---|
| 7,782,641 B2 | 8/2010 | Tashima et al. |
| 7,834,597 B1 | 11/2010 | Shekhawat |
| 8,723,487 B2 | 5/2014 | Pahlevaninezhad et al. |
| 8,866,455 B2 | 10/2014 | Jeong et al. |
| 9,312,719 B2 | 4/2016 | Jeong et al. |
| 9,484,806 B2 | 11/2016 | Jeong et al. |
| 9,548,630 B2 | 1/2017 | Sato et al. |
| 2002/0167825 A1* | 11/2002 | Okayama ............ H02M 5/4505 363/37 |
| 2006/0103365 A1 | 5/2006 | Ben-Yaacov |
| 2008/0304303 A1 | 12/2008 | Hsieh et al. |
| 2011/0141774 A1 | 6/2011 | Kyrberg |
| 2011/0236591 A1* | 9/2011 | Madocks .............. H02M 5/297 427/523 |
| 2011/0292697 A1* | 12/2011 | Alexander ............ H02M 5/275 363/37 |
| 2013/0162143 A1* | 6/2013 | Chen ....................... H01J 61/72 315/116 |
| 2015/0330868 A1* | 11/2015 | Fukami ................ G01N 1/2252 73/23.31 |
| 2016/0181944 A1 | 6/2016 | James et al. |
| 2016/0218624 A1* | 7/2016 | Ishizeki ................. H02M 1/32 |

\* cited by examiner

INPUT RESPONSIVE AC-AC CONVERTER FOR HEAT TRACING

CROSS-REFERENCE TO RELATED APPLICATIONS

This application is a non-provisional and claims the benefit of U.S. Prov. Pat. App. Ser. No. 62/508,282, entitled "Universal Power Converter," filed May 18, 2017, and incorporated fully herein by reference.

BACKGROUND

AC-AC power converters allow for flexible output power control in a variety of applications. Traditionally, power control for many AC loads is performed by duty cycle switching algorithms, which essentially skip entire line cycles, therefore regulating the output power without changing the peak output voltage. Presently, there exist solutions for AC-AC converters in the kW range. However, these solutions rely on an input switching stage, tank storage (such as in resonant converters), as well as an output switching stage (or inverter), and some solutions rely on a DC link. Implementing this solution in a "hazardous" area becomes costly and difficult. All of the existing solutions that both operate in the kW range and are commercially affordable rely on the use of an internal cooling fan, and such cooling fans are prohibited for use in power converters in hazardous areas. Specifically, the industrial heat tracing market does not allow for cooling fans in power converters in many crucial applications. Extending the present solutions for AC-AC converters with dialed-in peak voltage to heat tracing applications and hazardous area applications therefore becomes very costly.

Existing power converters are costly and many do not meet the requirements for use in the hazardous areas, and specifically for use in industrial heating tracing applications. Therefore what is needed is an improved power converter for use in hazardous areas.

SUMMARY

The preceding needs are met via the presently disclosed universal power converter configured for use in hazardous areas or non-hazardous areas. Embodiments of the invention provide an AC-AC power converter which produces AC power in the kilowatt range and controls the peak output voltage, while maintaining the substantially sinusoidal waveform required by many AC loads.

In one embodiment, a power converter for heat tracing applications is disclosed. The power converter includes a controller configured to control an input switching stage. The power converter also includes an output filter, the output filter electrically coupled to the input switching stage. Further, the power converter includes a passive cooling element, the passive cooling element coupled to the power converter. The controller is configured to select a peak voltage and set a power converter output voltage based on at least one of the peak voltage and a power converter input voltage. The passive cooling element is configured to decrease a temperature of the power converter. The input switching stage includes a plurality of solid-state switches such as MOSFETs, IGBTs or other transistors. The power converter output voltage and the power converter input voltage comprise alternating current (AC).

The passive cooling element may be a heat sink, such that the power converter is not cooled by a cooling system with moving parts, enabling operation of the power converter in hazardous areas. The output filter may include at least one of a resistor, a capacitor, and an inductor; the inductor may be configured to optimize an efficiency of the power converter. The power converter may be further configured for use with: a plurality of self-regulating heaters, each of the plurality of self-regulating heaters configured for a different power rating; and/or, a plurality of mineral-insulated heating cables each having a different cable input voltage, the controller controlling the input switching stage based on the power converter input voltage to produce, as the power converter output voltage, any of the different cable input voltages.

In another embodiment, an AC-AC power converter is disclosed. The AC-AC power converter includes a controller, the controller configured to control an input switching stage. Additionally, the AC-AC power converter includes an output filter, the output filter electrically coupled to the input switching stage. Further, the AC-AC power converter includes a heat sink, the heat sink coupled to the AC-AC power converter. The controller is configured to set a peak output voltage of the AC-AC power converter. The heat sink is configured to cool the AC-AC power converter. The input switching stage may include a full-bridge input switching stage, and the output filter may include a plurality of passive electrical components.

The heat sink may be sized so as to avoid the need for a cooling fan and any other cooling system with moving parts, enabling operation of the AC-AC power converter in hazardous areas. The full-bridge input switching stage may include a plurality of insulated-gate bipolar transistors (IGBT), the input switching stage configuring the AC-AC power converter as a Buck converter. The passive electrical components of the output filter may include at least one of a resistor, a capacitor, and an inductor; for example, the output filter may include a capacitor and an inductor electrically connected to the capacitor to form an LC filter. The controller may enable an operating range of the AC-AC power converter of 1 kW to 60 kW, and may configure the power converter for use with: a plurality of mineral-insulated heating cables each having a different cable input voltage, the controller controlling the input switching stage based on the power converter input voltage to produce, as the power converter output voltage, any of the different cable input voltages; and/or, a plurality of self-regulating heaters, each of the plurality of self-regulating heaters configured for a different power rating.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the present disclosure provide a system and a method for an AC-AC converter for use in heat tracing applications, self-regulating heaters, constant wattage heaters, and other heating applications. Additional embodiments of the present disclosure provide a system and a method for an AC/DC, DC/AC, DC/DC, or any other combination of converter, for use in heat tracing applications, self-regulating heaters, constant wattage heaters, and other heating applications.

Figure 1:
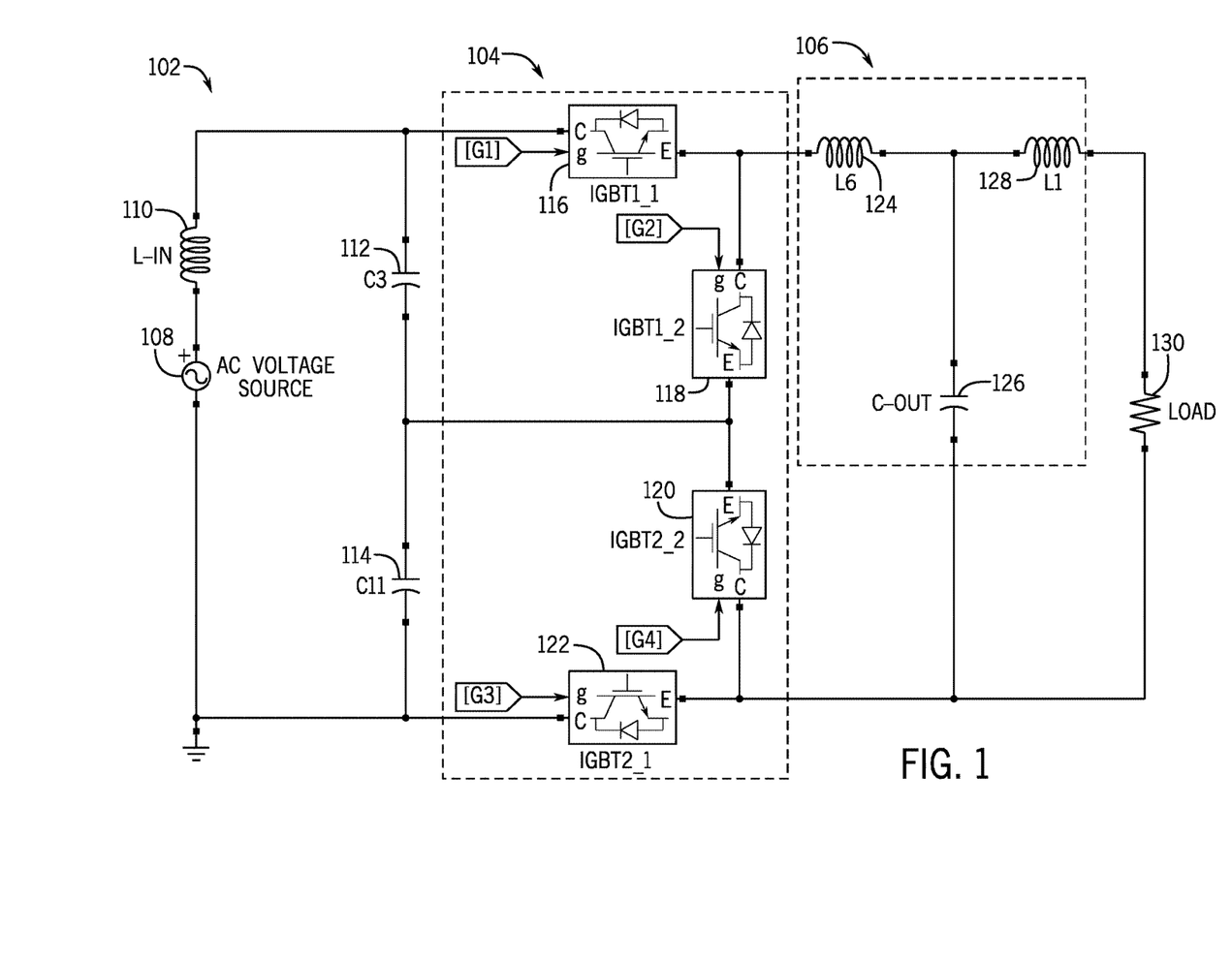
FIG. 1 is a circuit-level schematic of an embodiment of a universal power converter in accordance with the present disclosure.

FIG. 1 is a schematic of a power converter 102 in accordance with the present disclosure. The power converter 102 may be or include a customized Buck converter. The power converter 102 may include an input switching stage 104 as well as an output filter 106. An AC voltage source 108 may be provided in series with an inductor 110. Capacitors 112, 114 may be included within the power converter 102. The input switching stage 104 may include a plurality of transistors 116, 118, 120, 122. The transistors 116-122 may be arranged to establish a full-bridge input switching stage. The plurality of transistors 116-122 may include an insulated gate bipolar transistor (IGBT), a MOSFET, a silicon (Si) transistor, a silicon carbide (SiC) transistor, a gallium nitride (GaN) transistor, or any other element capable of switching functionality. The input switching stage 104 may be connected to the output filter 106. The output filter may include a plurality of passive electrical components. In certain situations, it may be beneficial to have an output filter 6 that includes an output inductor 124 and output capacitor 126 arranged to establish an LC filter. Additional passive components such as inductor 128 may be included in the power converter 102. Via the power converter 102, a load 130 (e.g., a heater cable as described herein) is supplied with a controlled voltage.

Still referring to FIG. 1, the power converter 102 may allow for a transformer-less voltage supply based on switching high frequency and high current transistors with intermittent energy storage in passive inductive and capacitive circuit elements. The output from the power converter 102 may be a sinusoidal AC waveform with a predetermined and selectable peak voltage. In some situations, it may be beneficial to use insulated-gate bipolar transistors (IGBT) for transistors 116-122. In some situations, it may be beneficial to use silicon carbide (SiC) for transistors 116-122. The predetermined and selectable peak voltage may have a wide range of possible selections. In some embodiments, the peak voltage may be selected from a range of 120V-0V. In other embodiments, the peak voltage may be selected from a range of 230V-0V. In other embodiments, the peak voltage may be selected from a range of 85V-600V. Alternatively, the peak voltage may be selected from any additional range of voltages. Power converter 102 may produce a selectable peak voltage without the use of tap transformers, which can be very costly. In some embodiments, the output from the power converter 102 may be 50 Hz. In some embodiments, the output from the power converter 102 may be 60 Hz. In certain embodiments, the output from the power converter 102 may have a frequency within the range of 1 Hz to 100 kHz. Alternatively, the frequency may be selected from any additional range of frequencies.

The power converter 102 may use passive cooling. The passive cooling may be performed via heat sinks within the power converter 102. Alternatively, the passive cooling may be performed via liquid cooling within the power converter 102. Utilizing passive cooling methods may enable power converter 102 to be used in applications that specifically do not allow cooling fans. One non-limiting example of this is the potential use of power converter 102 in industrial heat tracing applications and hazardous environments where spark-producing electronics, such as motorized cooling systems, are not permitted. Further, the power converter 102 may be used with self-regulating heaters. The power converter 102 may also be used with constant wattage heaters. One non-limiting example of such a constant wattage heater is Mineral-Insulated (MI) cables.

By selecting the peak voltage via the power converter 102, the number of different wattage ratings offered for self-regulating heaters cables may be consolidated. This differentiates the power converter 102 from the present market reality, where we desire different wattage output ratings, but have only one or few line voltages available. Further, the power converter 102 may enable the soft-start—defined as slowly ramping up the AC voltage from a lower range to the final range—of self-regulating heaters to avoid de-rating of circuit breakers for inrush situations.

At present, MI cables are either custom-manufactured for a given circuit length and available line voltage, or a very wide range of different MI cables need to be kept in inventory to satisfy the needs of the market. This is due to the present inability to dial in different voltages to supply MI cables. By selecting the peak voltage via the power converter 210, the wattage output of MI cables may be regulated to a desired or specified value, which may enable MI cables to evolve from custom-manufactured cables for a given wattage output based on fixed line voltages, to power output to a greater degree determined by the voltage.

Figure 2A:
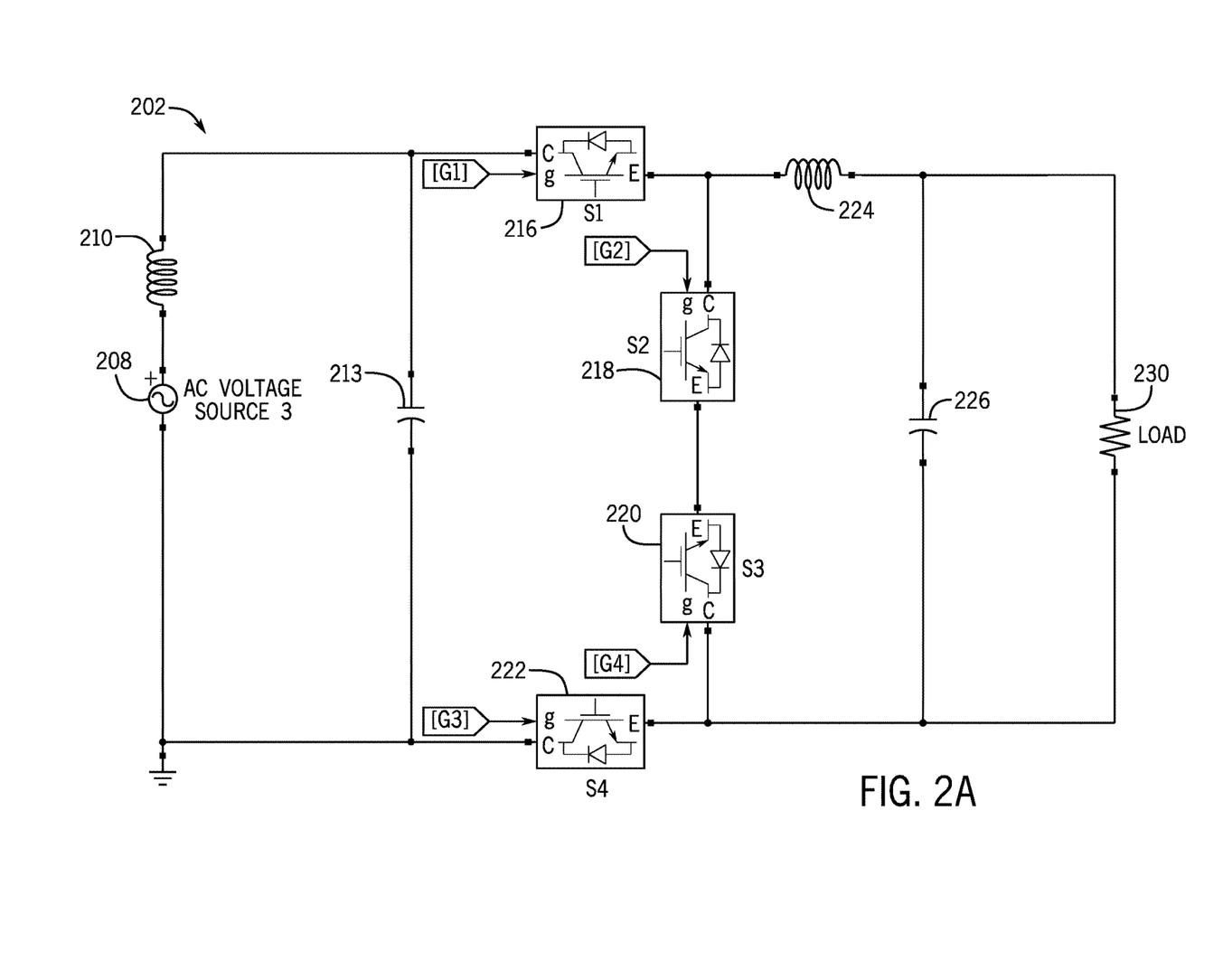
FIG. 2A is a circuit-level schematic of another embodiment of a universal power converter in accordance with the present disclosure.
Figure 2B:
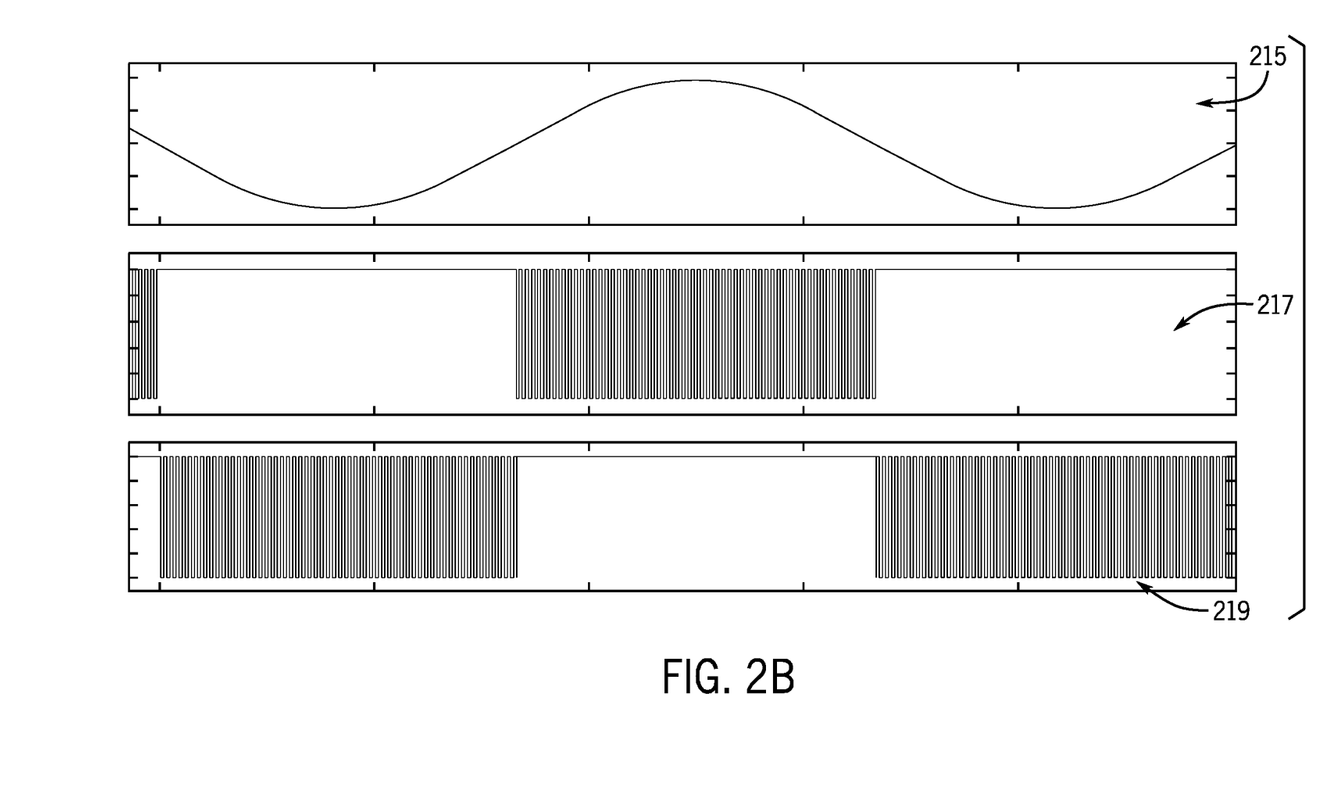
FIG. 2B is a waveform diagram showing operation of the universal power converter of FIG. 2A in accordance with the present disclosure.

FIG. 2A shows another non-limiting example embodiment of a power converter 202 as a simplified Buck Converter model. The AC source 208 may power the transistors 216, 218, 220, 222. The AC source 208 may be in series with the inductor 210. A capacitor 213 may be connected in parallel with the series combination of the AC source 208 and the inductor 210. The output inductor 224 and the output capacitor 226 may be included in the power converter 202. The load 230 may additionally be included. Here, transistor 216 is associated with $S_1$, transistor 218 is associated with $S_2$, transistor 220 is associated with $S_3$, and transistor 222 is associated with $S_4$. FIG. 2B shows simulation results corresponding to the embodiment shown in FIG. 2A. The AC source 208 input is shown by waveform 215. The switching of transistor 216 is shown by waveform 217 and the switching of transistor 220 is shown by waveform 219. One full-bridge input switching stage may be implemented, where switching as half-bridge occurs during each half-cycle. As shown, faster $S_1/S_2$ switching may occur during positive input polarity, and faster $S_3/S_4$ switching during negative input polarity. The power converter output voltage may be controlled through duty cycle control. In one non-limiting embodiment, switching transistors may comprise two half-bridge-IGBT modules. In another non-limiting embodiment, switching transistors may comprise four single-IGBT modules. In certain situations, it may be beneficial to use EMI/RFI suppression film capacitors, as they may perform better when compared with electrolytic capacitors.

Figure 3A:
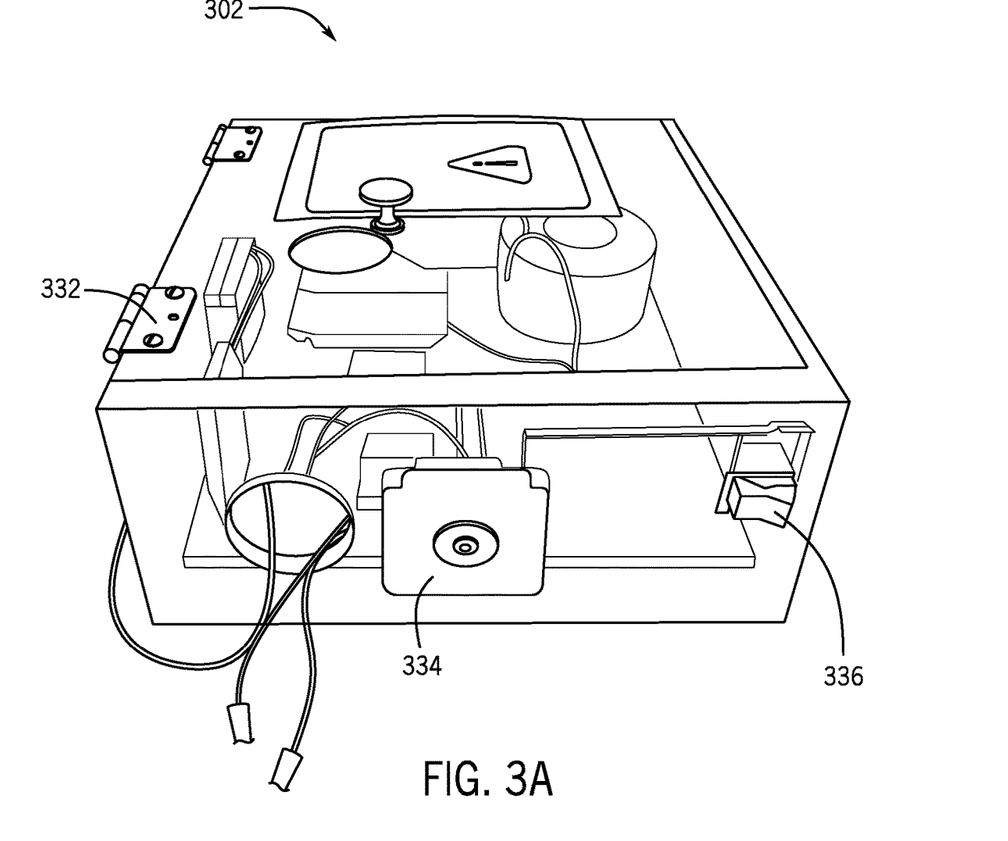
FIGS. 3A-3B illustrate a physical representation of another embodiment of a universal power converter in accordance with the present disclosure.
Figure 3B:
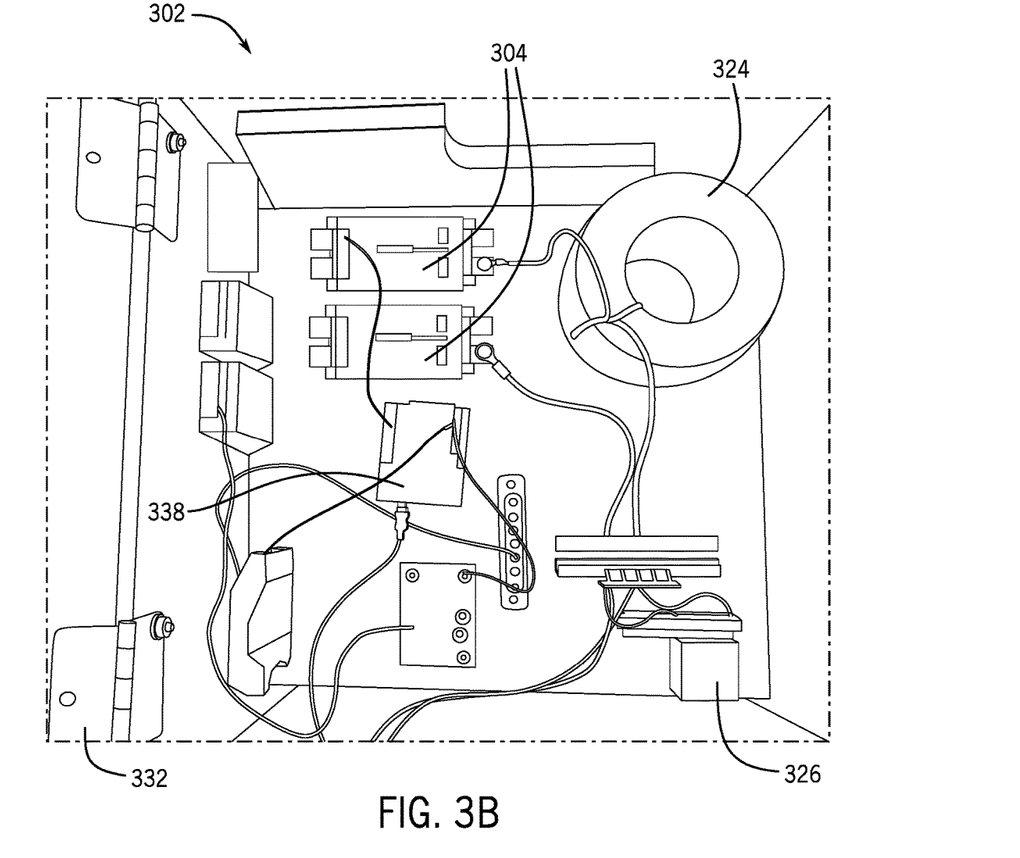

Referring now to FIG. 3A-3B, another example embodiment of the power converter 302 is shown. FIG. 3A shows an outside view of the power converter 302, which may implement any of the above-described electrical circuits. The power converter 302 may include a housing 332. Additionally, the power converter 302 may include an AC source input 334 and a power switch 336. FIG. 3B shows the inside of the housing 332. The power converter 302 again may include passive elements such as output capacitor 326 and output inductor 324. The power converter 302 may also include the input switching stage. In certain embodiments, it may be beneficial to have the input switching stage include a plurality of IGBTs 304. The output inductor 324 may be optimized specifically for efficiency purposes. As shown by FIG. 3B, the power converter 302 may include a controller 338. The controller 338 may be used to control the power converter output voltage. The controller 338 may be able to control voltages at efficiencies of 90%. Alternatively, the controller 338 may be able to control voltages at efficiencies above and below 90%.

Figure 4:
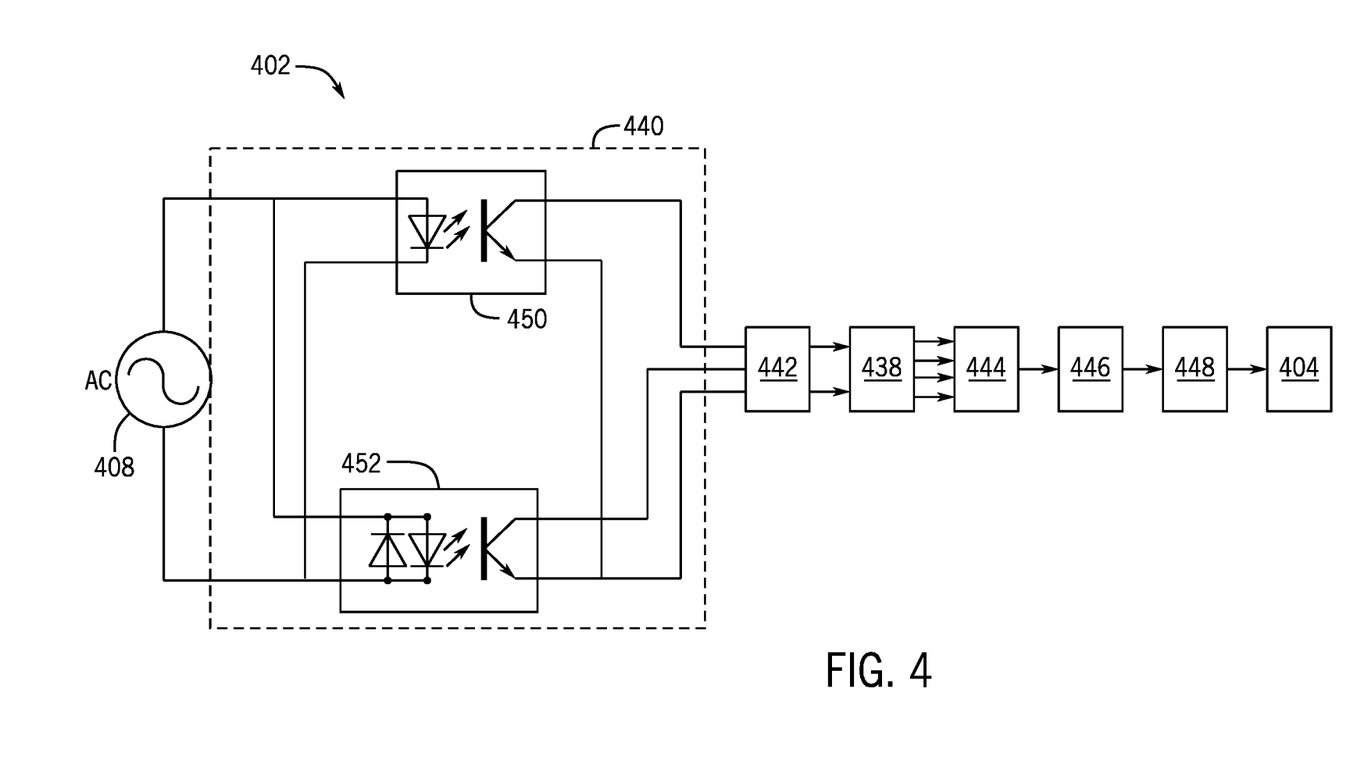
FIG. 4 is a high-level block diagram of an embodiment of a zero-crossing controller in accordance with the present disclosure.

Referring to FIG. 4, a high-level block diagram for one embodiment of a power converter 402 is shown. FIG. 4 demonstrates how a controller 438 as described above may be included within (i.e., as a component of) the AC-AC power converter 402. A zero-crossing detector circuit 440 is designed to detect input sinewave zero-crossing and polarity of the sinewave. The input may be a sine wave, a square wave or basically any waveform. The AC voltage source 408 may be connected to the zero-crossing detector circuit 440, which in some embodiments may be a system of optocouplers. The system of optocouplers may include a unidirectional optocoupler 450 and a bidirectional optocoupler 452. The output of the optocouplers 450, 452 may go to a Schmitt-Trigger 442 to have sharp-edge square waves; additionally or alternatively, the voltage can be controlled to have a logic output (high and low). An output of the Schmitt-Trigger 442 may be connected to the controller 438. The controller 438 may be connected to a plurality of optocouplers 444. The optocouplers 444 may be connected to another Schmitt-Trigger 446. An output of the Schmitt-Trigger 446 may be connected to a buffer 448. The buffer 448 may include a plurality of capacitors. An output of the buffer 448 may be connected to the input switching stage 404. As previously stated, the input switching stage 404 may include a plurality of transistors, as referred to in FIGS. 1 and 2A.

The theoretical logic of the zero-crossing detector circuit is shown by Table 1:

TABLE 1

| Zero Crossing Detector Logic | | |
|---|---|---|
| P (unidirectional output) | q (bidirectional output) | Input sinewave situation |
| 0 | 0 | Zero-crossing |
| 0 | 1 | Negative (180 to 360 degree) |
| 1 | 0 | N/A or Zero-crossing |
| 1 | 1 | Positive (0 to 180 degree) |

Referring to Table 1, a logical low is represented by a 0. A logical high is represented by a 1. A logical high may indicate a positive voltage, such as 3.3V, 5V, or another voltage.

Figure 5:
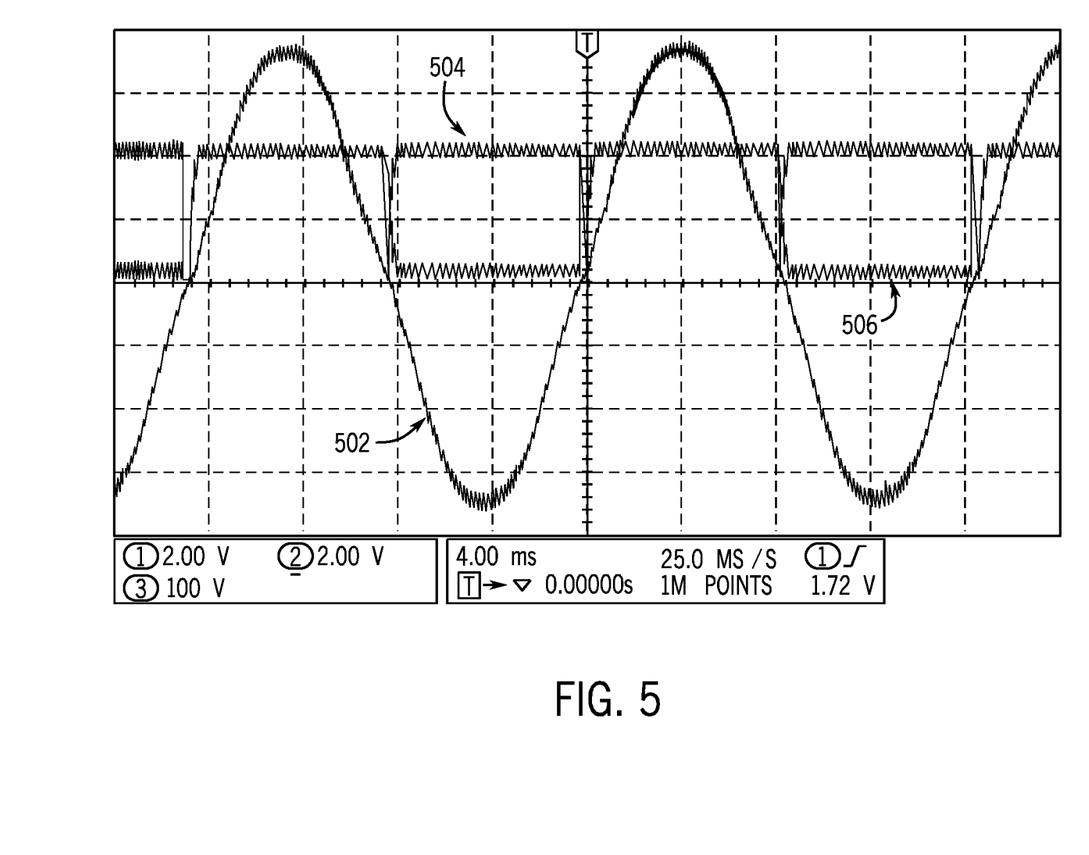
FIG. 5 is a simulated output in relation to the zero-crossing controller of FIG. 4 in accordance with the present disclosure.
Figure 6:
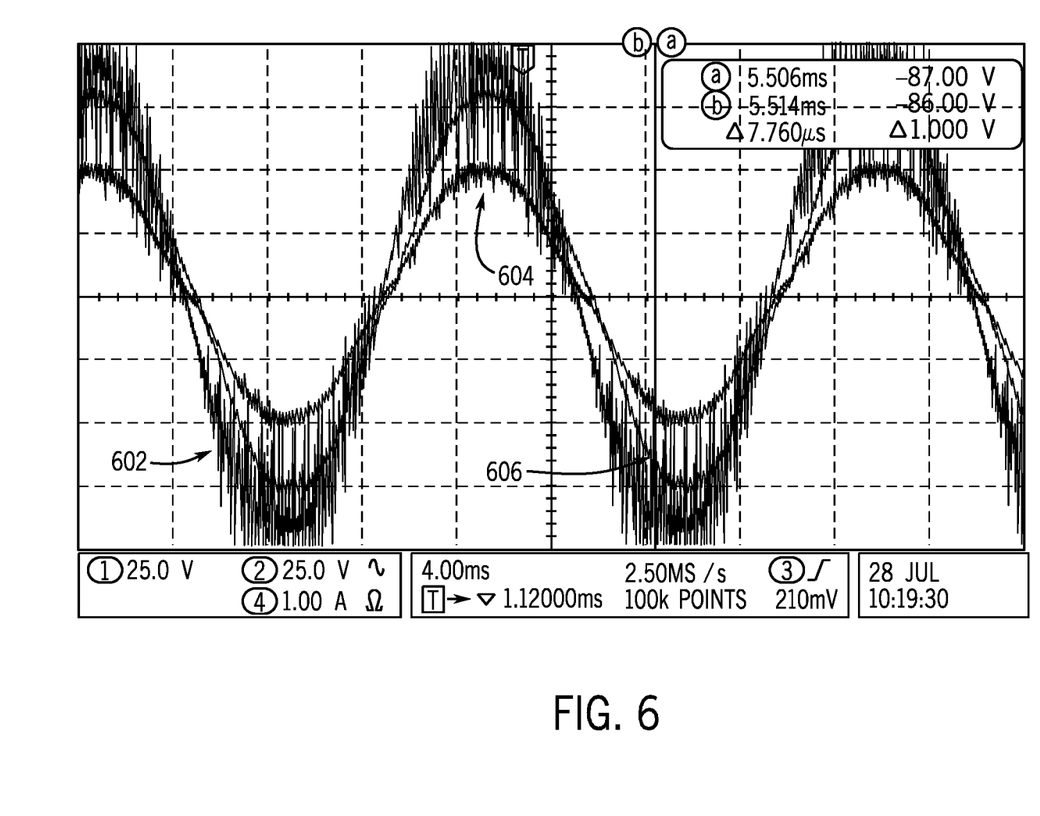
FIG. 6 is a plot of measured input and output of an embodiment of the AC-AC power converter described herein.

FIG. 5 shows simulated results of a zero-crossing circuit designed in accordance with Table 1. The sine wave 502 represents the voltage of the AC input power. The output of the bidirectional optocoupler is shown as wave 504, which is zero only at the zero-crossings of the sine wave 502, and is high (i.e., positive voltage) all other times (except for transition periods between zero and high). The output of the unidirectional optocoupler is shown as wave 506, which is high when the input voltage is positive and zero when the input voltage is negative, transitioning between zero and high states at the zero-crossings of the sine wave 502; wave 506 overlaps wave 504 when the input voltage is positive and both optocouplers are outputting a high signal. FIG. 6 shows a set of actual results of the input and output sides of the above-described example AC-AC converter, at a 60% duty cycle and a load of 16.5 ohms. The noisy sine wave 602 represents the voltage of the AC input power; the relatively clean sine wave 604 represents the voltage of the AC output power; and, sine wave 606 represents the output current, in ohms.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. A power converter for heat tracing applications, the power converter comprising:

a controller configured for use with a plurality of mineral-insulated heating cables, each individual cable in the plurality of mineral-insulated heating cables having a different cable input voltage, the controller configured to control an input switching stage comprising a plurality of transistors, and further configured to:
  select a peak voltage;
  set a power converter output voltage based on at least one of the peak voltage and a power converter input voltage, the power converter output voltage and the power converter input voltage comprising alternating current (AC) and the power converter output voltage being any of the different cable input voltages; and
  control the input switching stage based on the power converter input voltage to produce the power converter output voltage;
an output filter electrically coupled to the input switching stage; and
a passive cooling element, the passive cooling element coupled to the power converter to decrease a temperature of the power converter.

2. The power converter of claim 1, wherein the passive cooling element comprises a heat sink and the power converter is not cooled by a cooling system with moving parts, enabling operation of the power converter in hazardous areas.

3. The power converter of claim 1, wherein the output filter comprises one or more passive electrical components, each individual component in the one or more passive electrical components being selected from a group consisting of: a resistor, a capacitor, and an inductor.

4. The power converter of claim 1, wherein the output filter comprises an inductor configured to optimize an efficiency of the power converter.

5. An AC-AC power converter, the AC-AC power converter comprising:
an input switching stage;
a controller configured for use with a plurality of mineral-insulated heating cables, each individual cable in the plurality of mineral-insulated heating cables having a different cable input voltage, the controller configured to control the input switching stage producing an output voltage of the AC-AC power converter at any of the different cable input voltages and causing a desired peak output voltage of the AC-AC power converter;
an output filter electrically coupled to the input switching stage and comprising a plurality of passive electrical components; and
a heat sink passively cooling the AC-AC power converter.

6. The AC-AC power converter of claim 5, wherein the heat sink is sized so as to avoid the need for a cooling fan and any other cooling system with moving parts, enabling operation of the AC-AC power converter in hazardous areas.

7. The AC-AC power converter of claim 5, wherein the input switching stage is a full-bridge input switching stage comprising a plurality of insulated-gate bipolar transistors (IGBT), the input switching stage configuring the AC-AC power converter as a Buck converter.

8. The AC-AC power converter of claim 5, wherein each individual component in the plurality of passive electrical components is selected from a group comprising a resistor, a capacitor, and an inductor.

9. The AC-AC power converter of claim 5, wherein the passive electrical components comprise a capacitor and an inductor electrically connected to the capacitor to form an LC filter.

10. The AC-AC power converter of claim 5, wherein the controller enables an operating range of the AC-AC power converter of 1 kW to 60 kW.

11. A power converter for heat tracing applications, the power converter comprising:
an input switching stage; and
a controller in electrical communication with the input switching stage and configured for use with a plurality of mineral-insulated heating cables, each individual cable in the plurality of mineral-insulated heating cables having a different cable input voltage, the controller configured to:
  determine a peak voltage of a desired alternating output current produced by the power converter;
  determine a power converter input voltage from an alternating input current provided to the power converter by an alternating current (AC) source; and
  control the input switching stage based on one or both of the peak voltage and the power converter input voltage to cause the power converter to produce the alternating output current with a power converter output voltage selected from the different cable input voltages.

12. The power converter of claim 11, wherein the input switching stage comprises a plurality of transistors.

13. The power converter of claim 12, wherein the plurality of transistors cooperate to form a full-bridge circuit.

14. The power converter of claim 12, wherein the plurality of transistors receive the alternating input current from the AC source, the power converter further comprising:
an inductor electrically coupled to the input switching stage in series with the AC source; and
a capacitor electrically coupled in parallel with the inductor to form a simplified Buck Converter for producing the alternating output current at the power converter output voltage.

15. The power converter of claim 11, further comprising an output filter electrically coupled to the input switching stage, the output filter comprising a plurality of passive electrical components.

16. The power converter of claim 15, the plurality of passive electrical components comprising one or more inductors and one or more capacitors cooperating with the one or more inductors to filter an output of the input switching stage to produce the alternating output current at the power converter output voltage.

17. The power converter of claim 11, further comprising a passive cooling element disposed to cool the power converter, the passive cooling element enabling the power converter to be used in hazardous environments where spark-producing electronics are not permitted.

18. The power converter of claim 17, wherein the passive cooling element comprises one or more heat sinks.

19. The power converter of claim 11, electrically connectable between the AC source and any of the plurality of mineral-insulated heating cables, the controller controlling the input switching stage to cause the power converter to provide the alternating output current to a connected cable of the plurality of mineral-insulated heating cables at the corresponding cable input voltage of the connected cable.

20. The power converter of claim 19, wherein to determine the peak voltage, the controller is configured to select the peak voltage from a range of voltages based on a desired wattage output of the connected cable.

* * * * *